United States Patent [19]

Gray

[11] 4,147,302

[45] Apr. 3, 1979

[54] HOME HEATING SYSTEM CONTROL

[76] Inventor: Irwin Gray, 175-14 73rd Ave., Flushing, N.Y. 11366

[21] Appl. No.: 746,549

[22] Filed: Dec. 1, 1976

Related U.S. Application Data

[63] Continuation-in-part of Ser. No. 588,199, Jun. 19, 1975, abandoned.

[51] Int. Cl.² .............................................. F24D 1/00
[52] U.S. Cl. .................................... 237/9 R; 237/68; 236/61; 236/37
[58] Field of Search ........................... 237/9 R, 68, 67; 236/37, 40, 61, 66

[56] References Cited

U.S. PATENT DOCUMENTS

| | | | |
|---|---|---|---|
| 776,783 | 12/1904 | Hunter | 237/9 R |
| 1,265,928 | 5/1918 | McClymont | 237/68 |
| 2,222,324 | 11/1940 | Shoemaker et al. | 236/61 |
| 2,300,962 | 11/1942 | Pratt | 237/68 |
| 2,331,407 | 10/1943 | Mahoney | 237/9 R |
| 2,387,576 | 10/1945 | Graves | 237/9 R |
| 2,661,907 | 12/1953 | Wissmiller | 237/9 R |
| 2,886,247 | 5/1959 | Arbogast | 237/9 R |
| 3,747,108 | 7/1973 | Ringer | 325/37 |
| 3,770,196 | 11/1973 | Griffith et al. | 237/9 R |
| 3,949,936 | 4/1976 | Boyer et al. | 237/9 R |
| 4,024,474 | 5/1977 | Beckmann | 325/37 |

Primary Examiner—Henry C. Yuen
Attorney, Agent, or Firm—Ostrolenk Faber Gerb & Soffen

[57] ABSTRACT

A heat control system designed to control individual radiators in a heating system where there is only one boiler supplying steam, or one heated fluid source such as a utility steam supply, and where there is no separate condensate return line; each radiator or riser or both may be individually controlled by devices at and external of the radiator without the need for reconstructing the heating system itself or inserting any mechanical device within the system which will block return of condensates; there is an on-off control valve between the radiator and its vent valve and controllable preferably by a room thermostat; additional fuel saving controls may include a device that is responsive to the radiator becoming heated to a desired level or internal pressure in the radiator to provide an additional control for the control valve.

4 Claims, 12 Drawing Figures

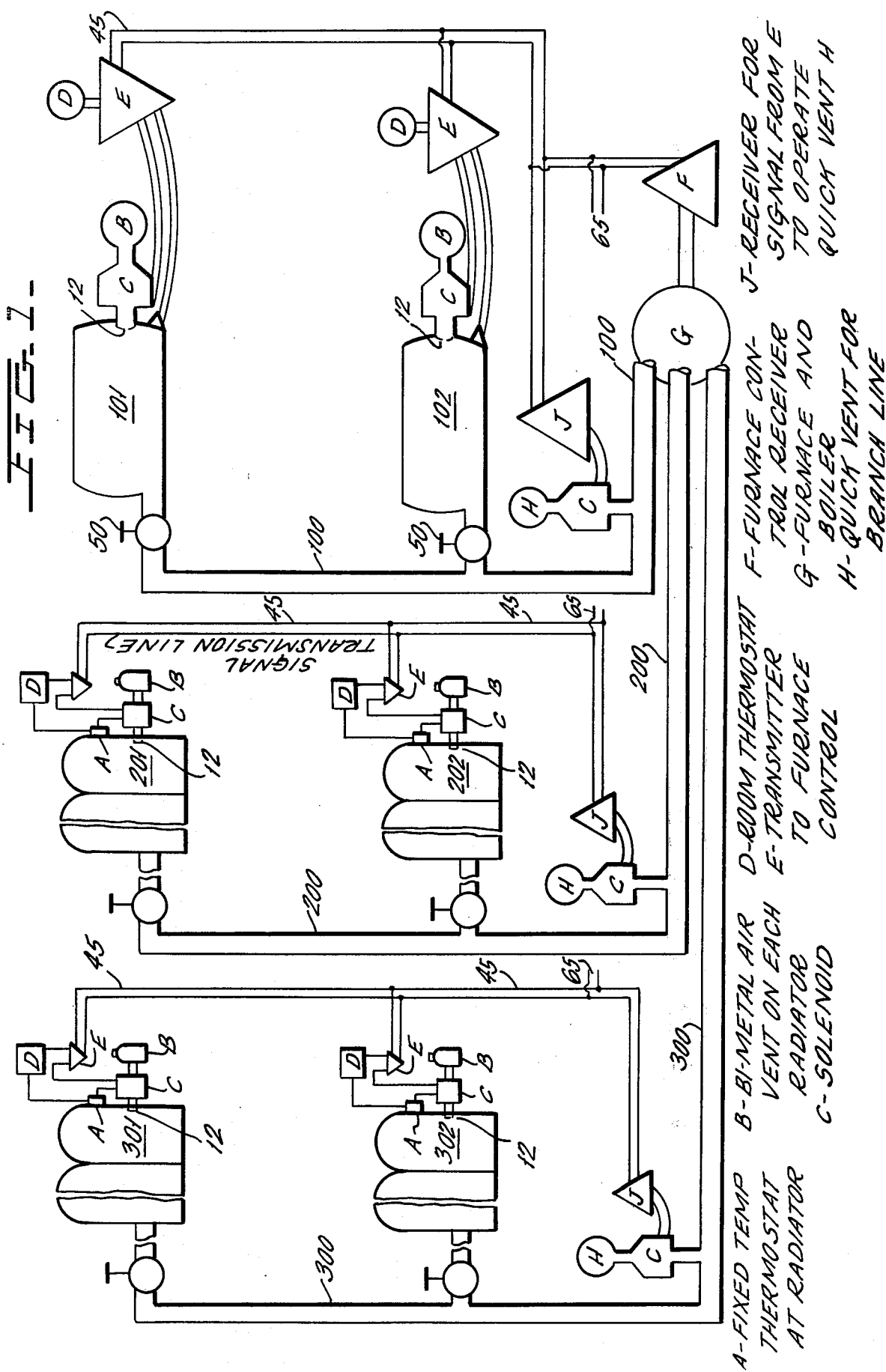

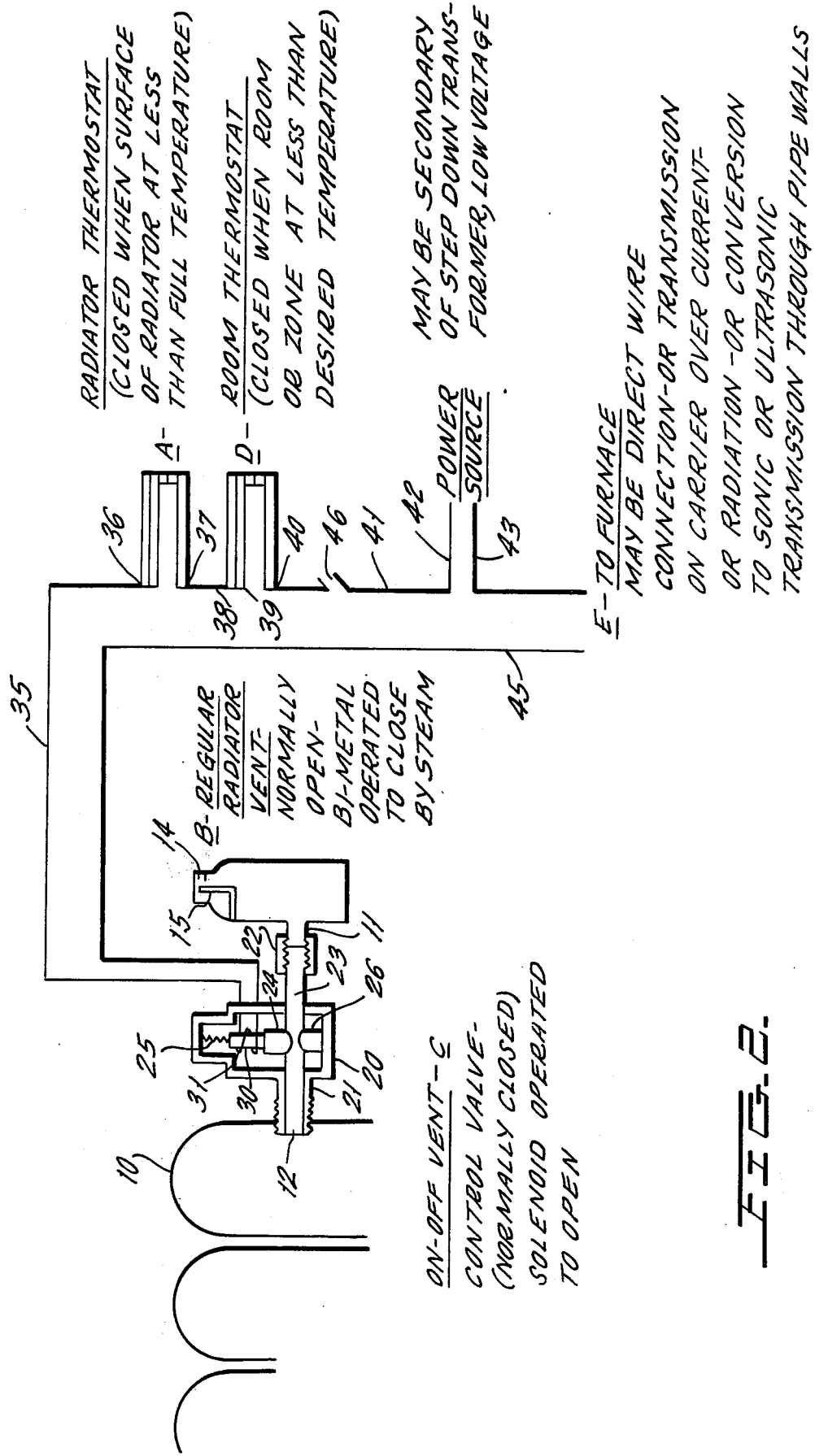

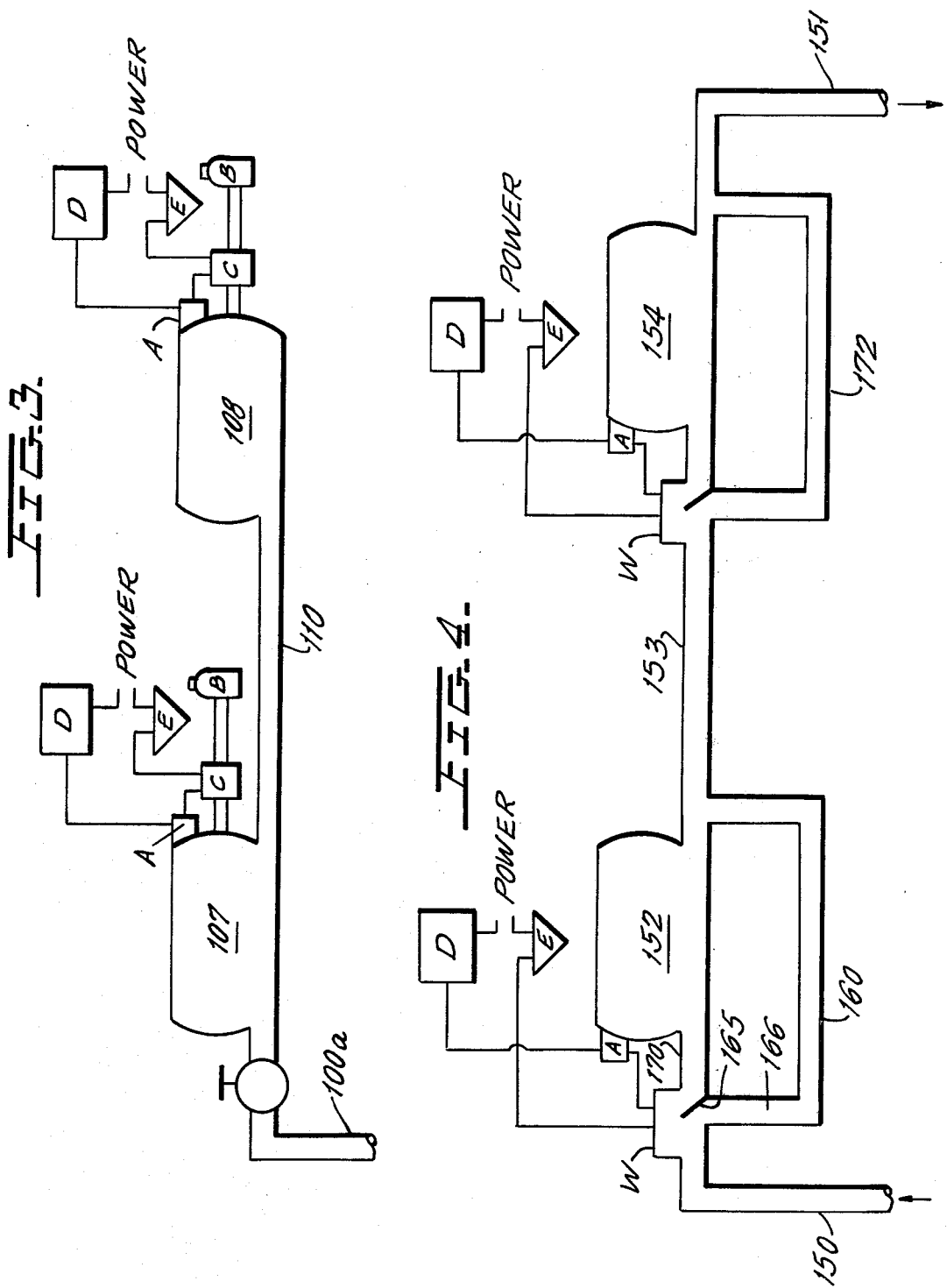

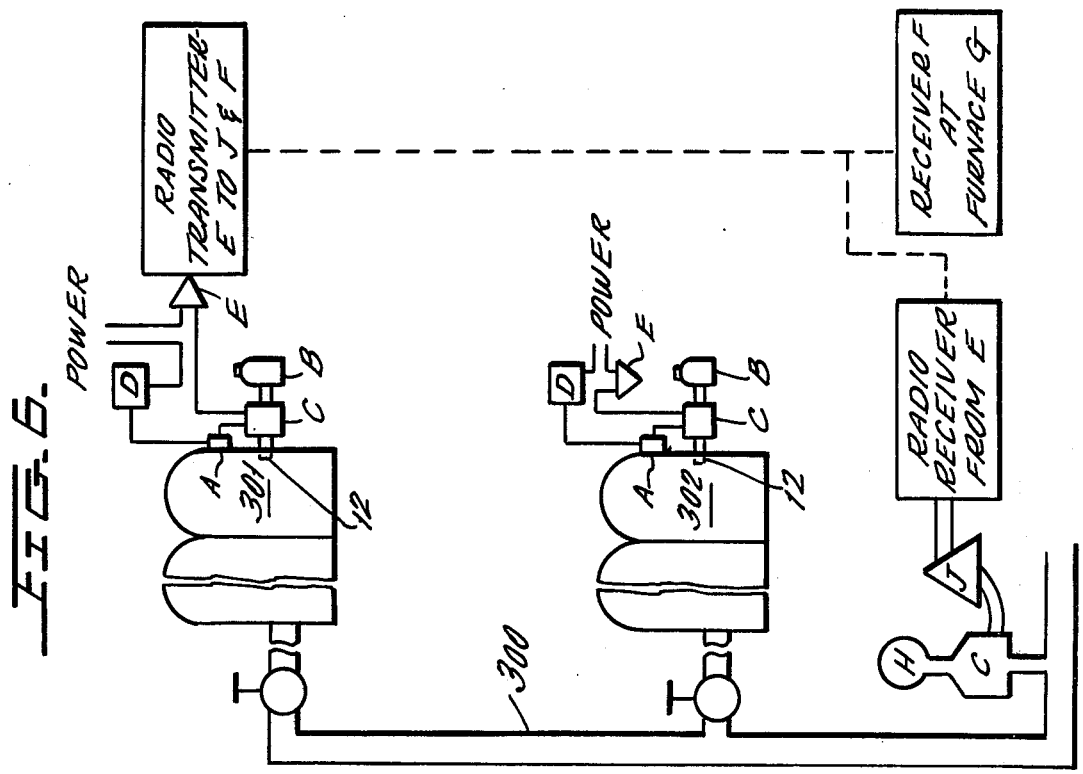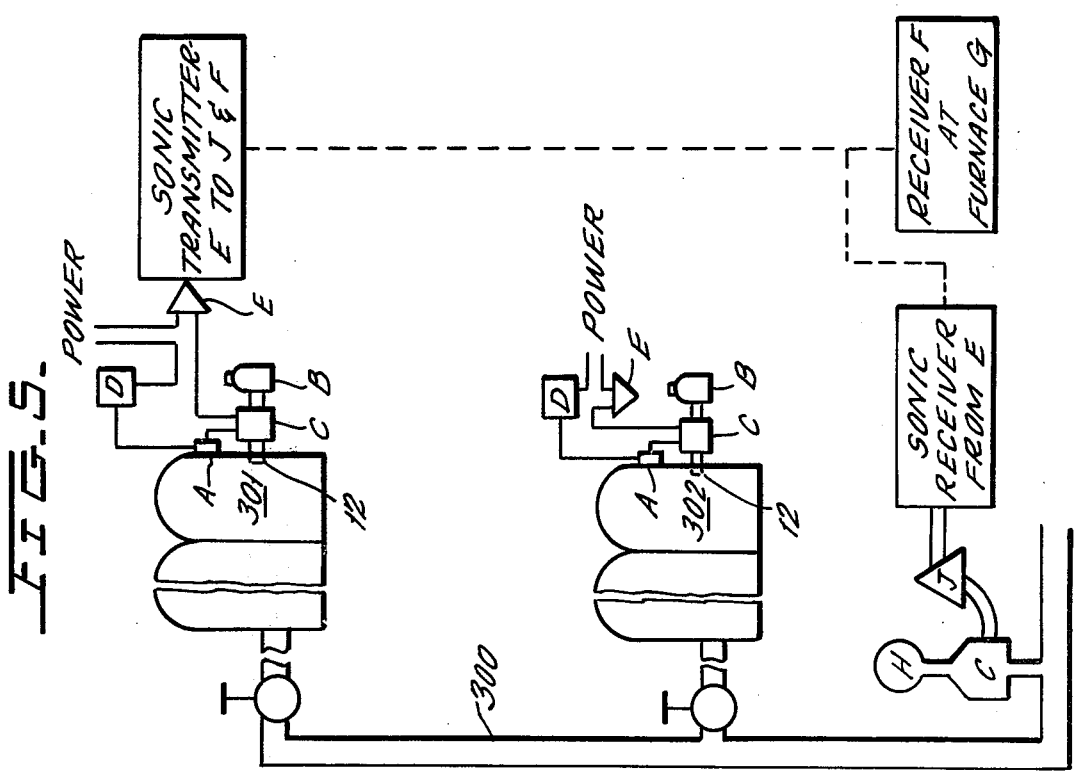

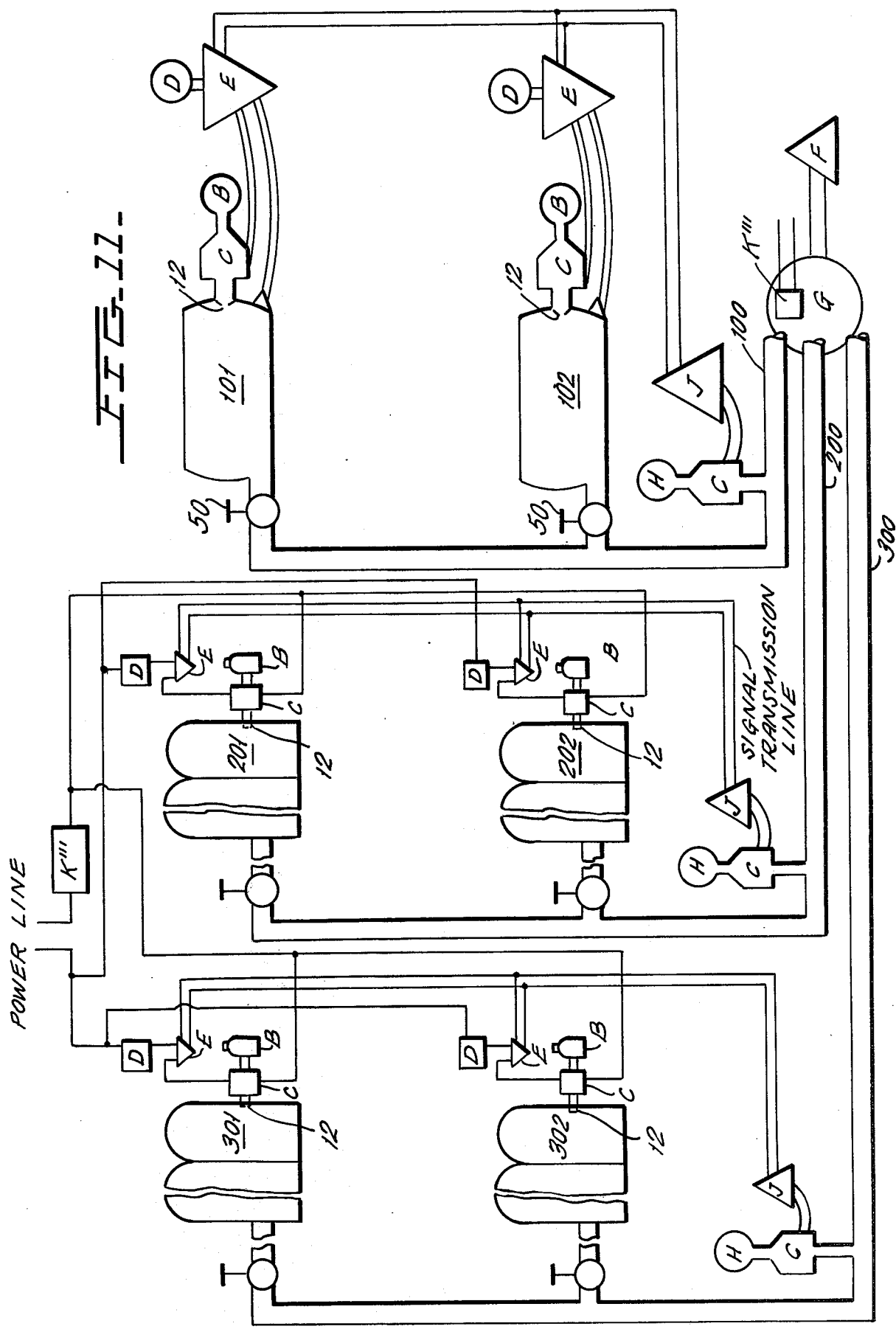

HOME HEATING SYSTEM CONTROL

This is a continuation-in-part of application Ser. No. 588,199, filed June 19, 1975, now abandoned.

The present invention relates to space heating systems and more particularly to controls therefor. Essentially, the invention contemplates so arranging the controls for a space heating system that, in effect, a zone system can be set up in which each heat radiation element is in a zone by itself. Each heat radiation element is then individually controllable without affecting the control of any of the other radiation elements or heat sources in the system. The controls for a space heating system are arranged without substantial cost for installation and no cost for restructuring of the heating system itself. The effect of a multi-zone system is achieved without the expense of installation of multizone plumbing or pipe connections.

Primarily, the present invention is directed to a home heating system. In steam and hot water heating systems presently in use, homes, small stores, and small commercial buildings are now zone heated by boiler heat sources which cycle on and off according to the command of the average heat required by all radiators in each of the zones.

BACKGROUND OF THE INVENTION

A zone is heated space in which a temperature responsive device, such as a thermostat, controls the operation of a common boiler or heat source for all of the zones. A valve or a separate pump sends hot water or steam to the particular heat zone measuring it. The control for each zone will turn on the common boiler or heat source. But, the hot water or steam circulation takes place only throughout the selected zone. A zone typically includes more than one heat radiation element. All elements of a zone are heated simultaneously, even if parts of the particular zone are not occupied or used by persons except at special times of the day or night. Thus, smaller size, and correspondingly more numerous zones are preferred.

Running separate piping systems or ducts for each zone and providing a separate control element for each zone is expensive and space consuming. Hot water systems are usually built with no more than two or three zones in the largest homes and steam systems usually have only one zone for an entire home.

Converting an existing single zone system to a multi-zone system or upgrading of two or three zone systems to a higher number of zones is totally out of the question economically or in terms of the physical remodeling which is necessary to accomplish this in most homes and small buildings.

Within a single zone, individual rooms may be too hot or too cold. Some are occupied at one part of the day and others at other parts of the day or night. Some adjustment for a too hot room is achieved by only partially opening the steam inlet valve or by some control of the steam outlet vent valve, or by choking off the flow of hot water in the case of hot water systems. This does not provide for efficient distribution of heat among all heat radiating elements in a zone. All of the heat radiating elements are being heated by the steam or hot water at the same time. If the largest radiator is used in a particular room and the room is still too cold, in a single zone system, all the other rooms are heated to a greater extent to get that particular room up to temperature.

At night only sleeping quarters require an elevated temperature while the rest of the house can be permitted to become much cooler. By day the reverse is true. However, with a single zone system, living rooms are kept up to temperature if the bedroom is to be kept comfortable.

To supply all the rooms in a zone with steam at the same time, the steam boiler or hot water furnace must be sized appropriately. This means that at start-up, for instance, in the morning, a much larger volume of water must be heated to get the system up to day temperature than would be necessary if steam or hot water were to go in only selected rooms and in a given sequence following a family living pattern through the day.

Schools and offices which use thermostats in every room effect closer zone control only by opening or closing valves leading to radiators in that room. This makes it necessary to have the steam or hot water in the pipes outside the room. The zone system merely channels the heating fluid in the form of steam or water to the proper radiator. The steam or hot water furnace is controlled by a sensor in a single area or is controlled manually by a custodian who tries to maintain the building at an average temperature level.

With this type of cycling, a room close to the boiler receives all the steam or hot water it needs and is invariably overheated while a room remote from the boiler is starved for the heat it needs even if its thermostat opens all the valves leading to that room.

Existing multi-zone systems, such as those used in school buildings therefore are predicated on having the steam or hot water supply available just outside the zone. But, a cold room cannot demand more performance than the custodian has programmed for the building average. These controls also involve complex pneumatic valve systems and long air runs between thermostat and radiator controls. A leak in the lines is a major problem.

STATE OF THE PRIOR ART

In a steam heating system, control of any individual radiator is obtained by opening or closing its vent valve. The open valve is sized to permit exit of the cold air in the radiator as steam enters the pipes at a rate consistent with the demands and size of all of the radiators on the line in that steam zone. A smaller vent prevents the radiator from heating too fast while other radiators receive steam. A larger vent allows the cold air to escape quickly and causes the radiator to heat quickly.

The steam radiator vent closes when the steam, having driven out the air, reaches the vent opening. The control in the vent itself, i.e., a bi-metal or other thermally responsive or steam responsive strip, closes the vent when struck by steam to prevent the steam from being exhausted into the room.

A cold radiator has an open vent. Steam entering the radiator pushes out the cold air before it. When the steam strikes the bi-metallic strip, the vent closes and halts the outflow of steam. The radiator stays hot for a while and then begins to cool off. The furnace is still sending up steam. Room is made for more steam by condensation of the steam in the radiator to water which flows down and back to the boiler and the vent may open again.

SUMMARY OF THE INVENTION

The present invention is applicable to steam heating systems and also to hot water systems.

The present invention contemplates that in a steam or hot water heating system, every heat radiation element is individually controlled. In effect, the zone control is made as fine as down to the individual heat radiation element. Essentially, the controls of the present invention make it possible to so arrange the operations of each of the heat radiation elements in the system as to achieve the same type of individual control as heretofore has been achievable with electrical hearting systems (in which even the heating element is electrical). Each heat radiation element and the zone it heats can have its own capability to demand steam or hot water from the central source be sent to it alone.

In the system of the present invention, the vent is controlled by an additional on-off valve that is preferably electrically operated, to shut down the heat radiation element until more heat is needed in that room or zone. This additional valve is preferably located between the heat radiation element and the safety vent.

For a radiation element which sould not be heated, the additional on-off valve shuts off access to the vent valve, thereby shutting off any passage of air through the radiation element which prevents the steam from entering the radiation element because it cannot push out the air in the radiation element.

A thermostat or other heat responsive or manually responsive devices may be used in each zone or room to control the on-off valve. The additional on-off valve is preferably electrically operated because the more usual method of its operation would be by electric signals from a thermostat and other elements. The thermostat may be so arranged that when the user turns the thermostat to the lowest possible temperature or to an "off" position, the additional on-off valve would be operated to close the passage to the vent from that particular heat radiation element or set of radiation elements in a particular room or zone and thereby prevent the steam from entering that particular radiation element or set thereof because the steam would be unable to drive the air in the radiation element out through the vent.

The room thermostat in normal operation, also controls the operation of the furnace or other heat source to obtain maximum efficiency and conserve fuel, as hereinafter described.

When a temperature setting is selected by the user, if the particular room requires additional heat in order to reach that temperature setting, then the thermostat contacts will close, closing the circuit to the furnace or other heat source or, in the alternative, closing a circuit which will transmit a signal to the furnace, to start the furnace and thereby provide steam which will be free to enter the particular heat radiation element or radiator in that room. That radiator will be able to receive the steam because the automatic closure valve is opened and the vent valve is still open. The steam is received until the air is driven out of the radiator through the radiator vent at which time the steam strikes the steam responsive means in the vent and automatically closes it.

A further feature of the invention comprises a sensing device sensitive to the conditions of the heat radiation element or radiator and/or of the system generating and transmitting heated fluid for shutting down the heated fluid generator or furnace when enough heated fluid has been generated to heat the radiation element to a desired extent, even before the zone or room has been fully heated. The heat radiation element continues to emit heat even after the heated fluid generator or furnace is shut down. The heat radiation element and furnace condition sensing device can be set to shut down the furnace while the radiation element continues to emit heat to warm the zone to the desired temperature. Such a sensing device may comprise a thermostat on or at any selected portion of a radiation element or of the system servicing the radiation element with contacts that open when a particular heating level is achieved.

Alternatively, the sensing devices may comprise moisture responsive devices at each radiator vent valve or in one of these valves per zone to close the valve in response to the moisture in the steam which strikes the device and to reopen the vent valve when the moisture content in the atmosphere within the radiator drops below a predetermined level.

As a further alternative, a pressure responsive device in each radiation element for sensing the pressure of the heated fluid in each radiation element may be used in place of the radiator thermostat to assist in controlling the opening or closing of the vent valve.

In the case of a hot water system, instead of having the on-off valve in the path of the air flow to the vent, the on-off valve may be provided in the hot water path to the heat radiation element or radiator. The on-off valve provides a control valve, which, in addition to shutting off the flow of hot water to the particular radiator, will also shunt the hot water into another pipe around the radiator and leading to the next radiator in line.

The primary object of the present invention, therefore, is the provision of a control system, particularly for a home heating system, useful for reducing the number of heat radiation elements in a heat zone.

A further object of the invention is to provide an effective control system for a steam heating system.

Yet another object of the invention is to provide an effective control system for a hot water heating system.

Another object of the invention is, without the introduction of any mechanical control devices in the steam path which may block the return of condensate from any radiator through the steam pipes and without blocking flow through the hot water heating system, to provide each radiation element in the system with individual controls, thereby in effect making each room or radiation element the equivalent of a single zone in the system.

Another object of the present invention is the arrangement of such a heating system so that even though multiple risers lead from a single boiler and furnace and multiple radiators are supplied by each of the multiple risers, nevertheless, without the intervention of any mechanical controls in the steam supply path and without any introduction of any mechanical device which may block or interfere with the flow of steam or the backflow of condensate, each of the radiators or other heat sources may be turned in effect into a single heating zone.

Further objects and descriptions of the present invention will become apparent from all the description and drawings, in which:

BRIEF DESCRIPTION OF THE DRAWINGS

FIG. 1 is a schematic view of the novel heating system of the present invention;

FIG. 2 is a schematic view and circuit diagram showing the location and operation of the automatic closure valve of the present invention;

FIG. 3 is a schematic view showing a slight modification of the view of FIG. 1;

FIG. 4 is a schematic view showing the application of the automatic closure valve of the present invention to a hot water heating system;

FIG. 5 is a schematic view, corresponding to a portion of FIG. 1, and showing the utilization of sonic transmission in order to transmit the signal for operation;

FIG. 6 is a view corresponding to FIGS. 1 and 5 showing the utilization of radio transmission to signal the supply of heating fluid, such as steam, to the particular radiator or set of radiators;

FIG. 11 is a schematic view corresponding to FIGS. 1 and 9 showing the pressure responsive device mounted in the furnace or boiler and responsive to the pressure in the boiler in order to provide a control which is a substitute for the thermostat A mounted on the heating system itself in the schematic views in FIGS. 1, 7 and 8.

DETAILED DESCRIPTION OF THE PREFERRED EMBODIMENTS

Figure 7:
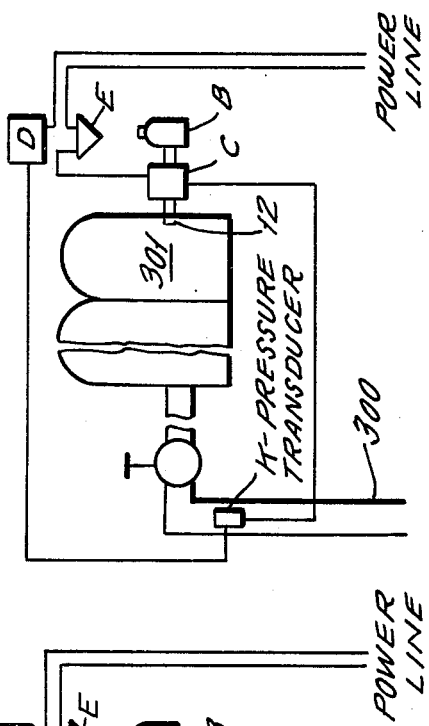
FIG. 7 is a schematic view corresponding to any radiator section of FIG. 1 showing the utilization of the thermostat which is responsive to the condition of the heating system itself mounted on the solenoid controlled valve C in contrast to the mounting on the radiator itself as in FIG. 1; thermostat A may also be mounted on vent B with the same control function.

Referring first to FIG. 2, the radiator 10 has a vent B. This vent is provided with a threaded stem 11 which is usually screwed into the threaded outlet opening or recess 12 of the radiator and provides normal venting for the radiator. The opening 12 would normally have received a vent like vent B. The vent B has an opening 14 through which air may be exhausted. The opening 14 is controlled by a bi-metallic element 15 which responds to the presence of heated steam. Thus, when the radiator 10 is turned on, the air in the radiator will be pushed out by the steam through the radiator opening 12 into the stem 11 of the vent B and through the opening 14 thereof. When steam strikes the thermally responsive element 15, the thermally responsive element 15 will be operated to close the opening 14 of the vent B and thereby prevent steam from escaping and permit the steam pressure to build up in the radiator as required (controlled for safety, of course, by any pressure responsive devices in the system—usually located near the furnace or boiler).

The essential element of the heating system of the present invention is the use and location of the automatic closure or on-off valve C between the radiator 10 and the radiator vent B. Valve C is shown as installed between the threaded radiator recess opening 12 and the stem 11 of the vent B. The on-off valve C comprises a casing 20 having a threaded extension 21 which may be threaded into the threaded opening 12 of the radiator 10 and having an opposite threaded extension 22 into which the stem 11 of the vent B is threaded. The two extensions 21 and 22 provide a clear passage 23 from the radiator opening 12 through to the vent B. This clear passage 23 may, however, be closed by the valve 24.

Valve 24 is normally biased downward in FIG. 2 toward closed position by the compression spring 25 which biases the valve 24 through the opposite aligned openings 26 and across the passage 23, to seal off the passage 23.

Valve 24 is provided with an operating magnetic armature 30, which is operated by the electromagnet coil 31. When the electromagnet 31 is energized, it attracts the armature 30 against the bias of the compression spring 25 and lifts the valve 24 clear of the aligned openings 26 across the passage 23 and thereby permits free passage from the radiator 10 through the passage 23 into the vent B.

When the vent valve C is closed or deenergized, even though the particular radiator is connected to a riser which is providing heat, the blockage of the expulsion of air from the radiator blocks the entry of steam and the steam thus cannot enter the radiator to heat it up.

As shown in FIG. 2, the automatic on-off valve and its electromagnet coil 31 is in series with the room thermostat D and with the below described radiator surface thermostat A, if it is used.

While it is extremely useful in the operation of the system, radiator thermostat A is not essential to the operation of the particular vent valve control system herein described. The thermostat A provides an additional means for control and fuel savings. The thermostat A is placed on the radiator itself in any suitable manner as shown in the schematic drawing of FIG. 1 to be responsive to the heat of the radiator itself. It is normally preset by the installer or the technician for the particular system requirement and is so arranged that it will open when a preset radiator surface temperature is reached—usually at or close to the maximum temperature that the surface can reach in the particular heating system. This ensures that steam will not be supplied to the particular radiator until the radiator cools by a predetermined amount from that maximum temperature.

While the thermostat may be pre-set or fixed, it may also be supplied as a variable thermostat which may be re-set by the installer or even the user for a particular desired condition. Thus, where the radiator is in a location where the maximum available surface heat may be deleterious to either the particular environment or some object or device near the radiator, the thermostat A may be adjusted to a lower setting.

Figure 8:
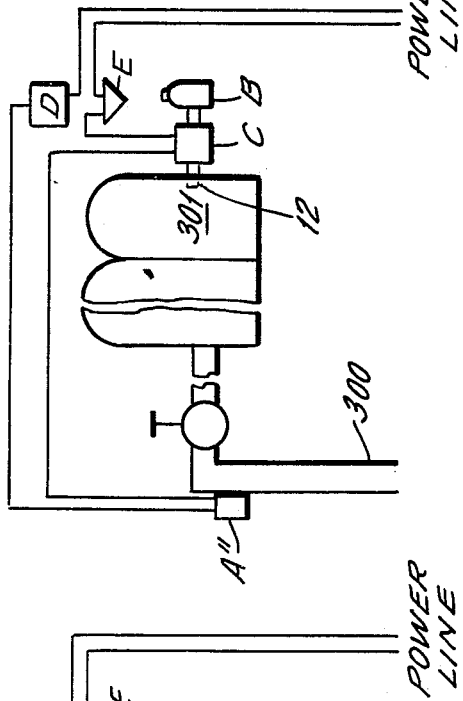
FIG. 8 is a view corresponding to FIGS. 1 and 7 showing the mounting of the thermostat which is responsive to the condition of the heating system itself mounted on one of the pipes leading to the radiator rather than on the radiator itself.

As may be seen from FIGS. 7 and 8, the thermostat which is responsive to the condition of the heating system itself which is thermostat A in FIG. 1 may be located at various selected portions of the system. Thus, in FIG. 7, the thermostat A' may be located directly on the control valve C or as shown in FIG. 8 the thermostat A" may be located directly on one of the risers 100, 200 or 300. In any case, the location of the thermostat A of FIG. 1, A' of FIG. 7 or A" of FIG. 8 on one of the surfaces which is heated by the heating system including the radiator itself makes the unit responsive to the condition of the heating system itself. When the external surface of the selected portion of the heating system reaches a desired or predetermined maximum temperature as previously described in connection with thermostat A, the thermostat will be operated to disconnect the control for the heating system and thereby either prevent the rising of the heat toward the radiator or the entry of heated fluid into the radiator.

Ordinarily, when a radiator is turned on in a closed room, it will first be heated to the maximum temperature it can attain and will continue to radiate out into the room until eventually the room air is heated up sufficiently to reach the room thermostat's setting and thus turn off the heat source.

However, when the room radiator surface reaches the maximum temperature it should reach in that particular room, the rate of radiation is such that it will radiate heat away more slowly than it is receiving additional steam. This will result in wasting of steam. Thus, by turning off the radiator when the radiator surface or any other available part of the system reaches the maximum heat that it should reach for the particular system, the requirement of that radiator for steam is temporarily halted. If that is the only radiator that is signalling the furnace to operate, the furnace will shut down.

An appropriate furnace-operation time reduction may be achieved by thermostat A itself. Thermostat A may be so arranged to be turned "off" at a temperature substantially lower than the maximum cut-off temperature. This will shut down the heating system somewhat before the desired room temperature is reached. Instead, the residual heat in the radiator will finish the job of raising room temperature to a desired point and will save a great deal of fuel. By this means, the radiator and the heating system are permitted to recycle until the desired room temperature is reached, at which time the room thermostat will shut off the demand from that particular radiator and—if that is the only radiator requiring service at the time—will shut off the heating system. Where the thermostat A is variable, the foregoing and other adjustments of the operation of the entire system may be made for a particular installation.

In each arrangement, the electromagnet coil 31 of the vent control on-off valve C is connected by lead 35 to one terminal 36 of radiator thermostat A (when the radiator thermostat is used). The other terminal of radiator thermostat A is connected by the lead 38 to a terminal 39 of the room thermostat D. The other terminal 40 of the room thermostat D is connected by lead 41 to one side 42 of the power source. The other side 43 of the power source is connected to transmitter E. The return circuit from the furnace or from "transmitter" section E of the circuit through lead 45 is connected to the on-off vent control valve C. When the radiator surface happens to be at the maximum heat, thermostat A will be open, and the room thermostat D, which is in series with thermostat A, will not be effective to call on the system to operate. If the radiator surface happens to be at less than maximum heat, then the room thermostat D is connected in series into the power source and will then control valve C so that it may call upon the system to operate. This will obviate recycling of the furnace in a momentary situation in which the radiator surface is at maximum heat and a room door or window is opened for half a minute or so, providing a cold draft to impinge on the thermostat D causing it to demand extra heat while the radiator itself is at its maximum heat or above the preset reconnection heat.

In FIG. 2, because the circuit for the electro-magnet 31 of the valve C is in series with the room thermostat D and the radiator surface thermostat A, the valve C will not open to permit a clear pathway through the passage 23 to the vent valve B unless both of the thermostats A and D are closed.

The room thermostat D may be provided with a null setting or an off-setting that would open the circuit to the vent control valve C permanently regardless of the temperature of the room. In other words, if the minimum temperature that the thermostat is set for is approximately 50°, the thermostat D may also be provided with a setting which is "null" or "off" to thereby prevent its contacts from closing at all, and thereby make sure that the passage 23 from the radiator 10 to the vent B is continuously closed. When the room thermostat D is placed off this "null" setting to a temperature setting which is higher than that in the room and the radiator is cold so that the thermostat A is also closed, the thermostat D will of course be closed and now a circuit will be established to the on-off valve C, thereby operating electromagnet 31 and opening the valve means 24 to open the passage 23 from the radiator to the vent B. At this time, the vent B will be permitted to operate.

As the steam comes into the radiator 10, the air in the radiator 10 will be forced through the passage 23 into the vent B and out through the opening 14. When steam strikes the thermally responsive element 15, the opening 14 of the vent valve is closed and steam cannot escape and may build up in the radiator 10.

An additional switch 46 may be provided to disable the system completely and cause the on-off valve C to remain closed at all times irrespective of the operation of the thermostat D or the thermostat A. Such a switch 46 although shown in lead 35 may be placed in any appropriate location, even made part of the thermostat D, but it would be operated solely when that particular radiator is to be closed off on a semipermanent basis.

Reference now to FIGS. 1 and 3 will show how a steam system works with the invention. In the schematic heating circuit shown in FIG. 1, the heat source is designated by the letter G. In this case the heat source may be, as it usually is in many areas, an oil-fired burner which heats the boiler to produce steam by methods which are now well known in the art. Obviously, the heat source may be a natural gas burner, may even be electricity in those few areas in the country in which electricity is sufficiently cheap, may be a coal burner, or may be any other means of generating steam, and may include steam piped to the home by a utility.

The steam then rises in risers or conduits 100, 200, and 300. Radiators 101 and 102 are shown connected to riser 100. Radiators 201 and 202 are shown connected to risers 200. Radiators 301 and 302 are shown connected to riser 300. Each of the radiators 101, 102, 201, 202, 301, 302 is provided with an inlet valve 50 which may be utilized to close off the radiator permanently. However, in view of the method of operation of the present invention, such an inlet valve may well be redundant except for the fact that it removes the possibility of steam rising in, for instance, the riser 100 above the inlet valve for radiator 102 when the inlet valve 50 for radiator 102 is open and the inlet valve 50 for radiator 101 is closed. Each of the radiators is provided with the control structure shown in FIG. 2 consisting of the thermostat A, the vent control valve C, the vent valve B, the room thermostat D, and the connection E to the furnace.

The connection E to the furnace may be a direct wire connection 45-65 to the furnace control structure F (FIG. 1). The furnace control structure F is simply a device well known in the art which, on receiving an appropriate signal from the thermostat D upon the closing of the circuit of FIG. 2, will energize the heat source G to cause it to initiate its cycle and start making steam if steam has not already been made and maintain the steam so that it may rise in the risers 100, 200 and 300. The methods of receiving such a signal at signal receiving device F from thermostat D or from other electrical devices in the house are well known and the method of using such signals to control the generation of steam from furnace G are well known.

It is sufficient to point out that transmitter E of FIG. 2, as well as the transmitters E of FIG. 1, may be connected in various ways to the receiver F to energize the furnace. There may be a direct wire connection 45-65 (FIG. 1) which is the simplest connection, but which may possibly offer aesthetic problems or installation problems when the installation is made in existing heating systems. Energization is from a low voltage transformer preferably at a voltage of the order of 24 volts. Hence, the energization wires present relatively little problem with respect to fire prevention and installation. The wires may actually be flat wires going along base boards and even along risers back to the signal receiver F. The wires may even be arranged so that they will go through the steam risers themselves back to the signal receiver F, since they are of low voltage and the insulation required may readily resist the steam atmosphere and the moisture condensate atmosphere in the risers. The transmitter E, instead of being a direct wire connection type may generate a carrier signal which may be plugged right into the house wiring and which, in turn, will carry an appropriately coded signal from the transmitter E to the receiver F, which is likewise plugged into the house wiring to receive the carrier.

The transmitter may even be a radiation type of transmitter as in FIG. 6 including means for transmitting a particular coded set of signals to distinguish from signals which may be transmitted by adjacent transmitters in the same or even in nearby houses. The transmitter E may even convert the electrical signal, when the circuit of FIG. 2 is completely closed, into a sonic or ultrasonic signal (see FIG. 5) which may be transmitted by impingement on the metal of the heating system to transmit a signal back to the receiver F. These are all well known expedients.

The essential element of the system of the present invention is the ability of the system, without installation of additional plumbing elements but only the installation of certain controls, to turn a heating system into a zone system having as many independently operable zones, if desired, as there are radiators. For this purpose the structure and circuit of FIG. 2 is repeated at each of the radiators 101, 102, 201, 202, 301, 302 and at as many more radiators as there may be in the system.

In FIG. 1 there is shown a so-called quick vent arrangement for the risers 100, 200, 300. The vent valve H in each of these risers is equivalent in operation to the vent valve B for each of the radiators except that it may be provided with a larger opening to permit faster venting of the air from the riser. The steam coming through the riser 100, for instance, will push the air ahead of it out through the vent valve H until the steam strikes the thermal strip 15 (see B of FIG. 2) of vent valve H when the vent valve will be closed. Thereafter the steam may rise in the riser more rapidly than if it had to push the entire body of air ahead of it through each of the radiators and their respective vent valves B.

Each of the vent valves H is preceded by a vent control, automatic closure, on-off valve C which operates in exactly the same manner as that shown in FIG. 2. In each case, however, each of the valves C is under the control of a receiver J which receives an appropriate signal from the transmitter E in each of the radiators connected to that particular riser. Thus, the transmitter E of radiators 101, 102 transmits a signal to the receiver J for the control valve C of riser 100 in addition to transmitting the same signal to the furnace control receiver F.

This is an additional fuel saving precaution which may be taken in order to make certain that the steam will be confined to its lowest possible position and will not even rise in the risers when there is no demand for heat.

When any particular thermostat for any particular radiator calls for heat, then not only does the circuit of FIG. 2 operate in the manner previously described both in connection with FIG. 2 and FIG. 1, but also the transmitter for that particular radiator transmits an appropriate signal to the receiver J for the on-off valve C for the particular riser which feeds that radiator in order to open the riser vent control valve and permit quick venting through the quick venting device H. The appropriate locations for the quick vents H and their on-off valves C in the risers 100, 200 or 300 are selected in accordance with experience with such quick vents in order to permit steam to reach each radiator as rapidly as possible and to conserve fuel by not heating long lengths of pipe.

It will thus be seen that by this system, in effect, each of the six radiators shown in FIG. 1, utilizing the structures applied thereto as shown in greater detail in FIG. 2, becomes a zone heating system all on its own. One radiator may receive heat while the others on the same riser receive no heat at all. One radiator may be controlled to receive and radiate a greater amount of heat and thereby heat the room in which it is located to a higher temperature than the room which is heated by another radiator in the same riser. Therefore, a particular comfort setting my be made for each of the rooms as selected by an individual who must occupy that room.

As has previously been described, not only is the system responsive to the room temperature itself through thermostat D, but it is also responsive to the condition of the heating system through thermostat A on the radiator of FIG. 1 or A' of FIG. 7 or A" of FIG. 8 on various parts of the heating system. Thus, if the heating system itself is radiating the maximum amount of heat of which it is capable, then the operation of the room thermostat to signal a further effort by the heating system would be defeated by the opening of the thermostat A or A' or A".

There are however various other ways of determining that the heating system is operating at the maximum heat radiation capacity for which it is designed. Such means need not necessarily include a thermostat on the heating system itself but may include means for gathering other indicia or other information which will provide an appropriate signal that the heating system is at its maximum phase of operation. The operation of such means will therefore render the room thermostat D incapable of initiating the supply of additional heat. If, however, the heating system is capable of providing more heat, the room thermostat, when it signals for more heat, will cause the operation of the heating system to drive toward its maximum adviseable output.

Figure 9:
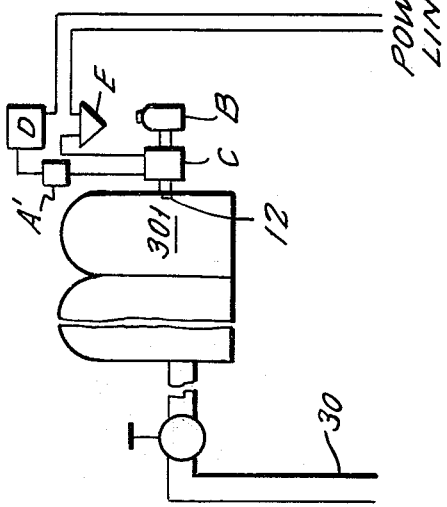
FIG. 9 is a view corresponding to any one of the individual radiators in the schematic drawing of FIG. 1 in which a pressure transducer is mounted in a pipe leading to the radiator as a substitute for the thermostat A which is mounted on the radiator in FIG. 1.
Figure 10:
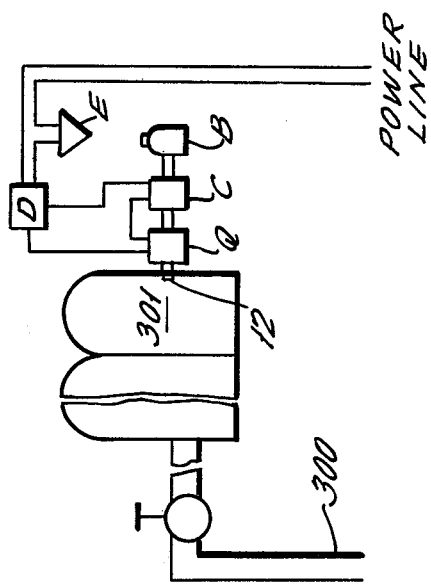
FIG. 10 is a view corresponding to that of FIGS. 1 and 9 showing a pressure responsive device mounted in the passage to the solenoid and vent valves thereby providing direct control of the solenoid valve in response to pressure. The pressure responsive device is here shown between the radiator and the control solenoid C. It also may be mounted between the control solenoid C and the vent valve.

Such means may include pressure responsive devices such as K of FIG. 9 K" of FIG. 10 or K'" of FIG. 11. The pressure responsive device is simply a well known pressure operated switch K which, as shown in FIG. 9, may be inserted into each of the risers, such as the riser 100 of FIG. 9 and connected through the control solonoid C and the room thermostat D in exactly the manner provided for the inter-connection of the thermostat A in FIG. 2. The switch K is thus responsive to the pressure of steam in the system adjacent the radiator in order to signal that the heating system is at its maximum heat generating capacity or that it is below its maximum heat generating capacity. When the pressure switch K is closed, it permits the room thermostat, when it calls for additional heat, to provide such additional heat. When the pressure switch K is open, it defeats the operation of room thermostat D to call for additional heat since the system is at its maximum heat radiating capacity.

Instead of placing the pressure transducer K in each of the risers adjacent the radiator as shown in FIG. 9, the pressure transducer K" may be placed at the exit or outlet portion of the radiator as shown in FIG. 10 adjacent to control valve C. Where desired, the pressure transducer or switch K'" may even be placed in the furnace or boiler, particularly in the boiler itself, so that if the boiler is at a predetermined maximum pressure, the closing of the room thermostat will not cause the furnace to operate until the pressure is reduced. It should again be noted that the pressure responsive transducers K, K", K'" are simply switches, which are well known, that are responsive to pressure, closing the circuit at a preselected lowered pressure and opening the circuit at a maximum pressure. Each of these pressure transducers K is connected in exactly the same way as is shown for the connection of thermostat A in FIG. 2.

Figure 12:
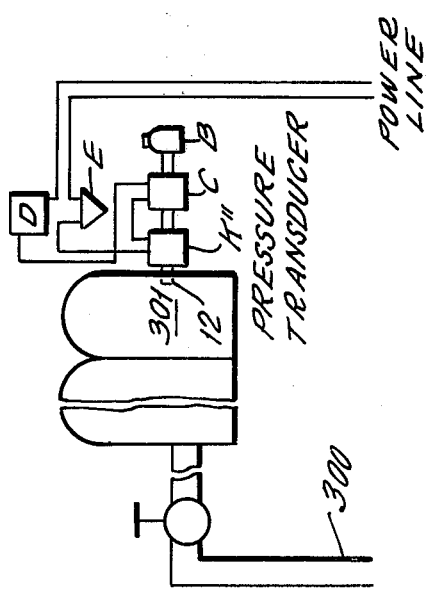
FIG. 12 is a schematic view also corresponding to one of the radiators in the schematic view of FIG. 1 showing the utilization of a moisture responsive device Q mounted on the radiator outlet and itself controlling the opening to the vent valve B.

Other devices may be used for the same purpose such as for instance a humidistat Q as shown in FIG. 12. Here the humidistat Q is located so that it is in the path of fluid venting from the outlet 12. When the steam begins to pass out through outlet 12 thereby indicating that the radiator is now filled with steam, then the humidistat Q will be operated in order to open the circuit. The humidistat Q is connected in exactly the same way as the thermostat A in FIG. 2. The humidistat is a well known device which will respond to the presence of moisture in a stream of fluid to operate a pair of contacts. In this case it will close the contacts in the event of decreased moisture or no moisture and will open the contacts in the presence of a selected concentration of moisture. In this case the humidistat Q will open the contacts when the moisture and steam exiting through outlet 12 saturates the same corresponding to or as a result of the filling of the radiator with steam. There will then be a time delay related to the rate at which the humidistat control dries out. As it dries to a predetermined extent, the contacts located therein will be permitted to close in the same manner as the contacts of thermostat A of FIG. 2 may be closed.

Thus, the humidistat Q or other humidity responsive contact member located in the exit for air or steam from the radiator outlet 12 will provide an appropriate signal to operate the solenoid control valve C to permit an exit of the air or other fluid to occur from the vent B; and thereafter to close the passage to the vent B when the moisture content of the exiting fluid is sufficiently high as to open the contact of the humidistat Q of FIG. 12.

In FIG. 3 there is shown an alternate form of the present invention, whereby radiators 107, 108 on the same riser 100a and in series with each other and connected together ay by pipe 110 may nevertheless be selectively heated in accordance with the present invention. With the structure of FIG. 2 applied to each of the radiators, as shown in FIG. 3, even though the radiators are in series and not in parallel, it will be obvious that if the valve C for radiator 107 is closed, then the air locked in the radiator cannot be driven out by the steam in the riser 100a. The steam will then go rapidly through the connecting pipe 110 to the radiator 108 and if the valve C is open, so that the air in the radiator 108 can be driven out, then the radiator 108 will be heated while the radiator 107 is not. The reverse operation may be true. Radiator 108 may be arranged so that it cannot be heated, by closing its valve C while radiator 107 may be arranged so that it can be heated, by opening its valve C so that the air may be driven out of the radiator 107 by the steam, which will then heat the radiator.

In FIG. 4, there are shown the essential elements of the system of FIG. 1, 2 and 3 applied to a hot water heating system. In this case, there is no means for venting air. The system is provided with a riser 150 and a return 151. The riser leads to the radiator 152 which is connected by the pipe 153 to the radiator 154 which, in turn, is conneted to the return 151. The thermostat A and the thermostat D and that transmitter E work in exactly the same manner as that previously described in connection with FIG. 2. The valve W has a function similar to that of the valve C of FIGS. 1 and 2; however, the valve W is electrically operated to open a shunt path around either of the radiators 152, 154. Radiator 152 is provided with the parallel shunt path 160 around the radiator 152. It will be seen that when the valve element 165 of valve W is closed on the opening 166 to the shunt path 160, then the hot water will be free to go through the radiator 152 and then through the pipe 153 to the radiator 154. When, however, the valve element 165 in control valve W is closed on the entry 170 to the radiator 152, then the hot water will flow around the radiator 152 in the shunt path 160. Similarly, the shunt 172 with respect to radiator 154 might be operated in an identical manner.

By this means, therefore, the arrangement is such that the control valve W having the valve element 165 is operated in exactly the manner described in connection with FIG. 2. The valve element 165 is biased toward closing the entry 170 to the radiator 152 and in the absence of any other signal, the hot water will flow around the shunt path 160. The same construction applies to the valve W of radiator 154 where, normally, in the absence of any other operation, the hot water will flow in the shunt path 172.

When, however, the thermostats A and D in series call for heat in the manner described in connection with FIG. 2, the valve element 165 of valve W will be moved against its bias to open the path 170 to the radiator 152 and close the entrance 166 to the shunt path 160. In this way, the hot water will then go through the radiator 152 to heat the radiator and the operation of the control of the valve K to establish the shunt path or disestablish the shunt path will be the same as that described in connection with FIG. 2 for steam.

The same operation will, of course, take place with respect to the second radiator of FIG. 4 and either or both of the radiators 152, 154 may thus be connected or disconnected as required.

In the foregoing, the invention has been described solely in connection with preferred illustrative embodiments thereof. Since many variations and modifications of the present invention will now be obvious to those skilled in the art, it is preferred that the scope of the invention be determined not by the specific disclosure herein contained, but only by the appended claims.

I claim:

1. A heating system comprising:
   a plurality of radiators (10), each having an inlet end and an outlet (12); a source of steam (G); conduits (100, etc.) connecting said source of steam to said inlets of all said radiators; each said radiator having a vent valve (B) at its said outlet, such that steam from said source of steam passes through said connecting conduits and drives any air in each said radiator through its said vent valve; means (15) for closing each said vent valve when steam in the radiator reaches said vent valve;
   an additional vent valve (C) for each said radiator connected to transmit venting flow from the respective radiator to the respective aforementioned vent valve (B);
   an on-off control for each said additional vent valve for permitting individual control of its said radiator comprising: a passage (21) from a said radiator to its said additional vent valve; a valve means (24) located in each said passage and operable to open said passage and to close said passage to open or close said additional vent valve;
   said valve means when closed, blocking access to its said additional vent valve from its said radiator and thereby preventing passage of air from said radiator through said first mentioned vent valve (B), thereby blocking the entry of steam in said radiator; said valve means when open, permitting the steam to drive air through both said vent valves, thereby permitting steam to enter said radiator;
   said valve means comprising means (25) applying a closing bias on said additional vent valve independently of room temperature and further comprising electrical means (31) to operate said valve to an open position;
   and a room thermostat (D) located in the area in which a said radiator is positioned;
   electrical connection means (35, etc.) from said room thermostat to said valve electrical means for operating said valve and causing said valve to open at a predetermined temperature;
   means including said room thermostat (D) for controlling said steam source (G) to cause steam to enter said conduits and to stop additional steam from entering said conduits; said latter means comprising transmitting means (E) for transmitting a signal from said room thermostat to said steam source for controlling the steam source to start the entry of steam into said conduits at said predetermined temperature and to halt entry of steam into said conduits at another, higher, predetermined temperature;
   whereby when said room thermostat causes a signal to halt the entry of steam into said conduits, the said electrical means is deenergized thereby causing said additional vent valve to close.

2. The heating system of claim 1, in which a pressure transducer is mounted in the path of flow of steam to each radiator which is to be controlled said pressure transducer being responsive to the pressure in the system at the point at which it is located; said pressure transducer having a pair of contacts; and means operated by the pressure in the system to open the contacts at a predetermined maximum pressure and to close the contacts at a predetermined lower pressure; the pressure of said system being related directly to the temperature of the system and to the temperature of the radiating surfaces of said system, said pressure transducer being connected to said means for controlling said steam source to permit steam to enter said conduits when said pressure transducer contacts are closed and to stop additional steam from entering conduits when said pressure transducer contacts are opened.

3. The heating system of claim 2, in which said room thermostat has a pair of room thermostat contacts the connected in series with said pressure transducer contacts; said transmitting means being activated to start the entry of steam into said conduits when both of said pressure transducer contacts and said room thermostat contacts are closed; said transmitting means transmitting a signal to halt the entry of steam into said conduits when either set of said pressure transducer contacts and said room thermostat contacts are open.

4. The heating system of claim 3, wherein the connection between said transmitting means to said means for controlling said steam source comprises a transmitter connectable to electrical wiring in the area and a receiver at said means for controlling said steam source and connectable to said electrical wiring; said transmitter being capable of generating a carrier and of modulating said carrier; said receiver being capable of receiving said carrier and responding to the modulation thereof.

* * * * *